United States Patent
Jarrett, Jr.

(10) Patent No.: US 6,571,093 B1
(45) Date of Patent: May 27, 2003

(54) METHODS FOR PROVIDING EXTENDED WIRELESS DATA TRANSPORT SERVICES

(76) Inventor: Harold M. Jarrett, Jr., 4567 Bogie Rd., Duluth, GA (US) 30096

(*) Notice: Subject to any disclaimer, the term of this patent is extended or adjusted under 35 U.S.C. 154(b) by 0 days.

(21) Appl. No.: 09/527,500

(22) Filed: Mar. 16, 2000

(51) Int. Cl.$^7$ .............................................. H04M 11/00
(52) U.S. Cl. ...................... 455/408; 455/405; 455/418; 455/461; 455/422; 455/551
(58) Field of Search ................... 455/461, 422, 455/517, 456, 551, 405, 408, 406, 419, 420, 418

(56) References Cited

U.S. PATENT DOCUMENTS

| | | | | |
|---|---|---|---|---|
| 5,862,470 A | * | 1/1999 | Damghani | 455/181.1 |
| 6,240,295 B1 | * | 5/2001 | Kennedy, III et al. | 455/456 |
| 6,311,056 B1 | * | 10/2001 | Sandidge | 455/412 |
| 6,311,060 B1 | * | 10/2001 | Evans et al. | 455/426 |
| 6,449,483 B1 | * | 9/2002 | Akhteruzzaman et al. | 455/445 |
| 6,526,272 B1 | * | 2/2003 | Bansal et al. | 455/406 |

* cited by examiner

Primary Examiner—William Trost
Assistant Examiner—Danh Le
(74) Attorney, Agent, or Firm—Kenneth W. Float

(57) ABSTRACT

Methods that extend capabilities of wireless data transport services. The methods provide for communication with many wireless remote data transport devices. In one embodiment, the identity of each wireless remote data transport device is subdefined by placing additional identification information into data fields of packets transmitted by the wireless remote data transport devices. In another embodiment, identification numbers assigned to wireless remote data transport devices are time division multiplexed across a large number of remote devices. In another embodiment, multiple wireless remote data transport devices share the same primary identification number and are communicated with by transmitting a page of the shared identification number, followed by a page containing a secondary identification number, followed by a page containing a command to transmit data.

10 Claims, 3 Drawing Sheets

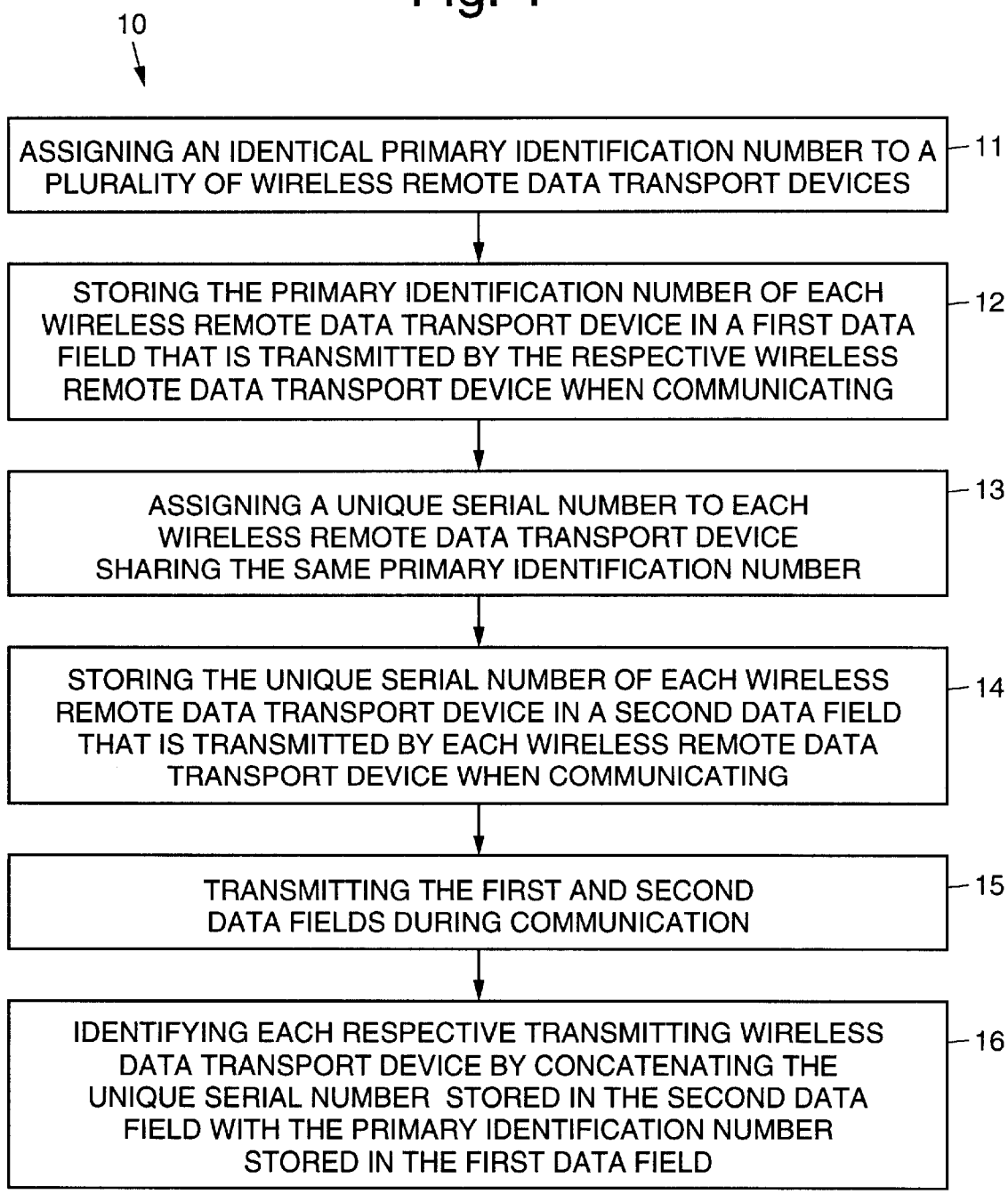

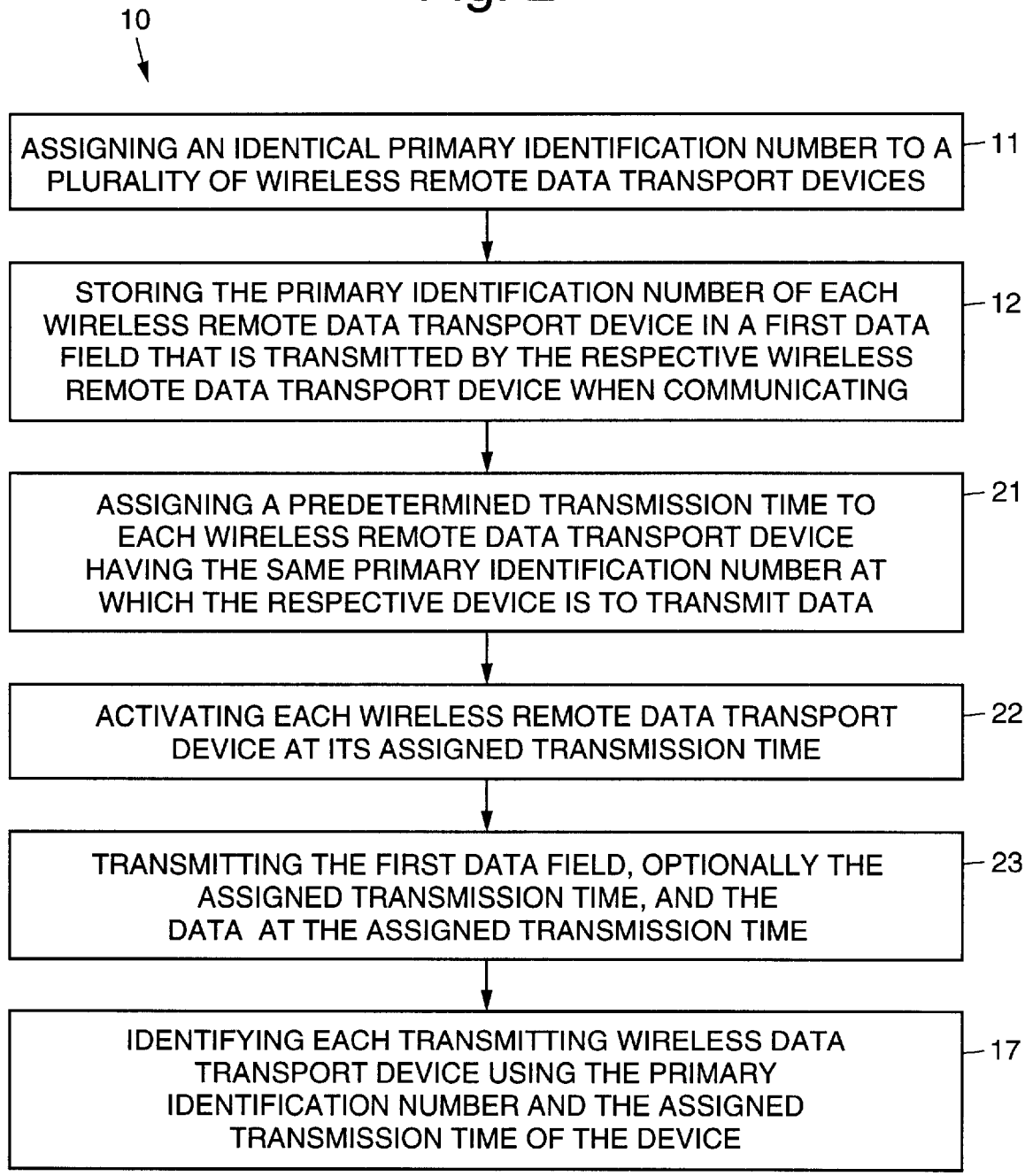

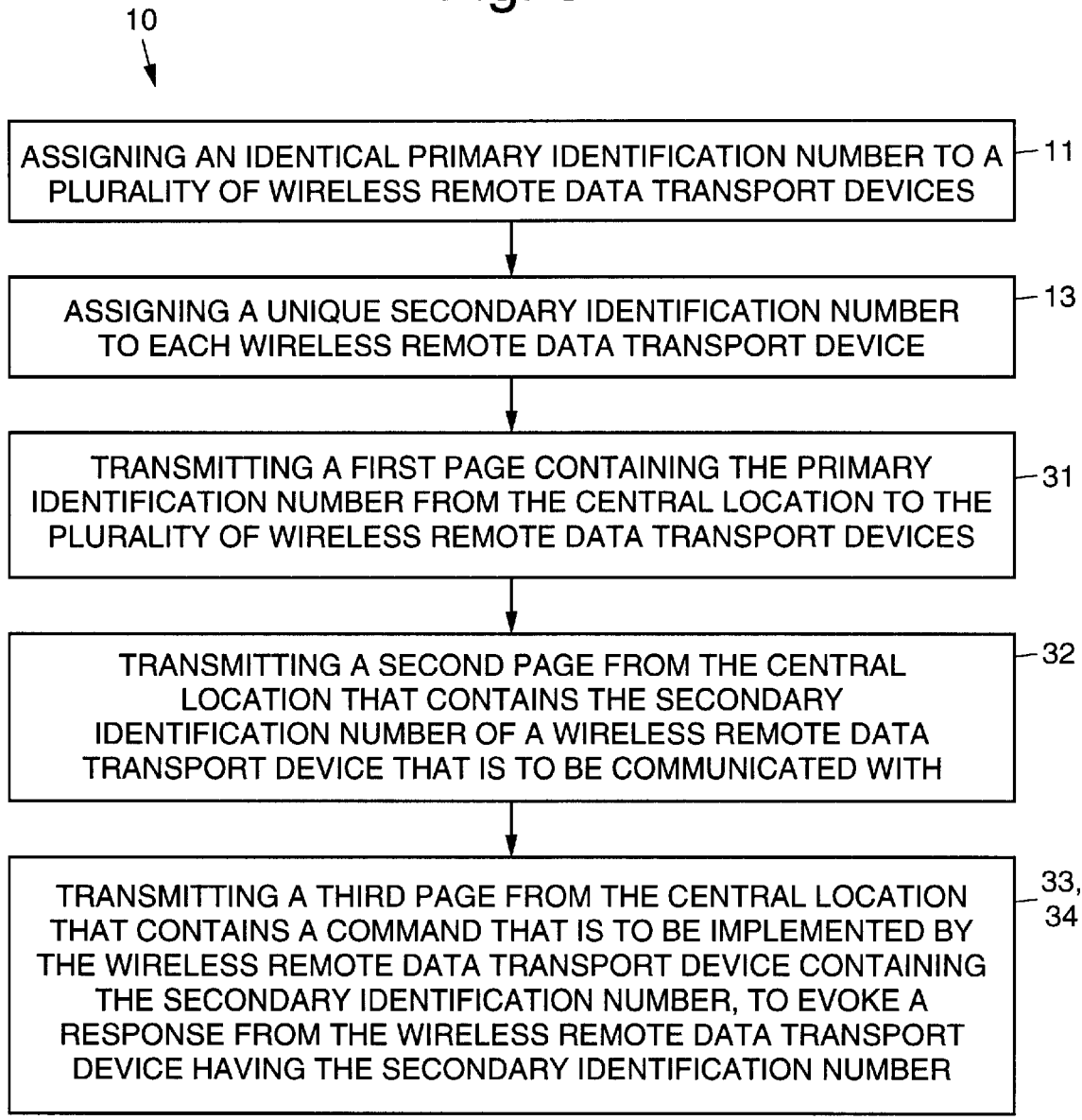

METHODS FOR PROVIDING EXTENDED WIRELESS DATA TRANSPORT SERVICES

BACKGROUND

The present invention relates generally to wireless data transport services, and more particularly, to methods that extend the capabilities of wireless data transport services, and the like.

Certain wireless data transport services utilize the digital control channels of the cellular network. Among these are Cellemetry™ and Aeris™. Based on the definition described by the cellular model, there are at least two essential data "packets" that are transmitted on control channels to allow cellular phone identification and control as a cellular user moves around from place to place.

The first primary data packet is a Mobile Identification Number, or MIN. The mobile identification number is the "telephone number" of the remote cellular phone. The mobile identification number is typically a 10 digit number in the style of landline phone numbers. The second essential data packet is an Electronic Serial Number, or ESN, of the remote phone. This electronic serial number is intended to uniquely identify the specific handset in use, helping cellular providers prevent fraudulent use of a user's account.

In the case of Cellemetry service, the MIN and ESN have different uses from normal voice service. The MIN serves as a unit identifier while the ESN field carries 32 bits of live, remote data. The ESN will be referred to as a Data Field herein for clarity. This data is transmitted by the remote cellular device and is collected by a central processing computer remotely located from the cellular device. The Cellemetry service acts as a data conduit by transferring a string of data from the remote cellular device to the central computer owned by the company who needs to retrieve the remote data. When transmission occurs, the remote cellular phone sends in a string of data including (in the case of Cellemetry) its MIN (identifying itself) and its ESN (the data to be transferred).

There is a limited supply of MINs available to wireless providers, and because of supply and demand, the value of a MIN is relatively high. For example, a subscriber to the Cellemetry service may pay $5.00 to $10.00 per MIN per month. While this may not seem particularly high, it can be prohibitively expensive for many applications such as remote meter reading, where per-meter-per-month reading costs commonly are in the $0.50 range.

It is therefore an objective of the present invention to provide for methods that extend the capabilities and lower the operating costs of wireless data transport services, such as Cellemetry services, remote monitoring or remote control services, such as remote meter reading, and the like.

SUMMARY OF THE INVENTION

To accomplish the above and other objectives, the present invention provides for methods that extend the capabilities of wireless data transport services. The present methods permit communication with many more wireless remote data transport devices that has heretofore be possible. In particular, the present invention increases the number of users of cellemetry services, such as remote monitoring or remote control services, including remote meter reading, and the like, by increasing the number of Remote Device Identification Numbers (RDINs) that may be used.

For purposes of clarification, the RDIN is an extended MIN. The MIN is defined as a 10 digit number. In the context of Cellemetry, for example, the quantity of available MINs is limited to a small portion of the total number of possible MINs that could be defined by 10 digits. The majority of MINs are used by standard cell phones. The RDIN in this example is defined by concatenating the MIN with another number, creating more than 10 digits of identity. For example, if an additional 3 digits are concatenated onto the MIN, then the RDIN would have 13 digits, or 1000 times more identity possibilities than the MIN from which it originated.

In one exemplary embodiment described in full below, the additional number concatenated onto the MIN is a number allowing many remote units to share the 10 most significant digits (the MIN) while being uniquely identified (RDIN) by the added least significant digits. In a second exemplary embodiment described below, the added number represents a time slot, during which the device becomes active, and outside of which the device is dormant; This time slot may be a day of the month, a day of the week, an hour of the day, or a combination of these or other time identities. Specific examples are discussed below.

In a first exemplary embodiment, the identity of each wireless remote data transport device is subdefined by placing additional identification information into data fields of packets transmitted by the devices. In a second embodiment, mobile identification numbers assigned to wireless remote data transport devices are time division multiplexed across a large number of remote devices. In both embodiments, multiple devices sharing the same primary identification number are communicated with by paging (transmitting) the shared primary identification number, followed by a page (transmission) containing a unique secondary identification number, followed by or including one or more pages containing commands or data.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 1 illustrates a flow diagram of a first embodiment of a method in accordance with the principles of the present invention;

FIG. 2 illustrates a flow diagram of a second embodiment of a method in accordance with the principles of the present invention; and FIG. 3 illustrates a flow diagram of a third embodiment of a method in accordance with the principles of the present invention.

DETAILED DESCRIPTION

Referring to the drawing figures, FIG. 1 illustrates a flow diagram of a first embodiment of a method 10 in accordance with the principles of the present invention that extends the capabilities of wireless data transport services, such as Cellemetry services, remote monitoring or remote control services, such as remote meter reading, and the like. A plurality of wireless remote data transport devices, such as remote monitoring or remote control devices, including meters, for example, are employed that are each assigned a primary Mobile Identification Number, or MIN, and transmit a Data Field.

The MIN corresponds to the "telephone number" of the remote device. The MIN is typically a 10 digit number. The Data Field contains remote data and numbers that uniquely identify the particular remote device beyond the identity of the MIN. During operation, the MIN and Data Field are each transmitted by the remote monitoring or remote control devices by way of cellular sites to a central processing computer at a centralized location. The present invention increases the number of devices that may be located within a cellular carrier's system by increasing the number of identification numbers that may be assigned to the proximate devices.

In the first embodiment of the method 10, the primary mobile identification number (MIN) of each remote monitoring or remote control device is subdivided into a plurality of additional secondary identification number (SubMINs) by placing a separate distinct serial number or ID number into the Data Field.

For example, if a primary MIN is to be subdivided into 100 secondary SubMINs, two digits are included within the Data Field with the specific function of defining the secondary SubMIN. This takes up two of the available 8 characters in the Data Field packet. Thus, a given primary MIN, such as 0051002000 may be reused 100 times in the same location where the actual device number is redefined as the MIN plus the SubMIN, 0051002000-00 through 0051002000-99. This description is used as an example, and is intended only to be representative of the method of extending the number of possible device identities.

With specific reference to FIG. 1, the first embodiment of the method 10 comprises the following steps. An identical primary Mobile Identification Number (MIN) is assigned 11 to a plurality of wireless remote data transport devices. The primary identification number (MLN) of each wireless remote data transport device is stored 12 in a first data field that is transmitted by the respective wireless remote data transport device when communicating. A unique serial number (SubMIN) is assigned 13 to each wireless remote data transport device sharing the same primary MIN. The unique serial number of each wireless remote data transport device is stored 14 in a predetermined number of bits of a second data field that is transmitted by each wireless remote data transport device when communicating.

The first and second data fields containing the primary and secondary identification numbers are transmitted 15 during communication by each respective wireless remote data transport device. Each respective transmitting wireless data transport device is identified 16 by concatenating the secondary identification number stored in the second data field with the primary identification number stored in the first data field upon receipt of the data.

The value provided by this embodiment of the method 10 assuming that each MIN is further identified by 2 SubMIN digits, allowing the same primary MIN to be shared by 100 remote devices is that the $5.00 per MIN per month fee becomes $0.05 per device per month, which advantageously suits the financial requirements of remote meter reading, for example.

Referring to FIG. 2 it illustrates a flow diagram of a second embodiment of a method 10 in accordance with the principles of the present invention. In the second embodiment of the method 10, multiple remote devices share the same primary identification number (MIN), but these devices only become active (on-line) on a preset schedule. This may allow a device to be active on only 1 day per month, 1 hour per day, or 1 hour on 1 day per month, for example.

With specific reference to FIG. 2, the second embodiment of the method 10 comprises the following steps, An identical primary identification number (MIN) is assigned 11 to a plurality of wireless remote data transport devices. The primary identification number of each wireless remote data transport device is stored 12 in a first data field that is transmitted by the respective wireless remote data transport device when communicating.

A predetermined transmission time is assigned 21 to each wireless remote data transport device at which the respective device is to transmit data. Each wireless remote data transport device becomes active 22 at its assigned transmission time. The primary identification number and data are transmitted 23 at the predetermined transmission time. Each respective transmitting wireless data transport device is identified 17 using the primary identification number and the predetermined transmission time of the respective wireless data transport device. The transmitted Data Field may optionally contain an identification of the time slot programmed into the device if data space permits.

For example, the subdivision may be defined by dividing the primary identification number (MIN) into 28 secondary identification numbers (SubMINs), each for a different day of the month. Then, when the remote device detects that its secondary identification number (SubMIN) matches the day of the month, it "wakes up" and becomes active, transmits its data, and goes back to sleep. As mentioned above, the device may optionally include the SubMIN (1 to 28 in this example) within the Data Field to provide unambiguous identification of the devices' message when received.

To further subdivide the primary identification number (MINs) for meter reading (or other cost-sensitive use), the remote device may be subdivided or identified in terms of the hour of the day. Then, each remote device detects that its assigned hour on its assigned day of the month has arrived, it becomes active, transmits its data, and then goes back to sleep.

This subdivision of 24 hours times 28 days allows a single primary identification number (MIN) to be used on 672 remote devices (meters), reducing the per-MIN per-month cost burden to less than $0.01. At this point the negotiated rate for each transmitted packet becomes the actual cost of the use of the primary identification number (MIN).

Commonly, the price of each transmission averages between $0.05 and $0.10. These values offer an exceptional opportunity to utilize this transmission medium in ways that would be otherwise too expensive. Thus, the present invention provides an enormous value compared to traditional uses.

The remote devices may contain a clock circuit which gives them indication of the proper time to register their respective, or they may be triggered by an external event at the appropriate time. One example of an external event could be created by paging a time or synchronizing page. If the utilization is such that only one device sharing a primary MIN must register each day of the month, then a single page containing the day of the month can provide the necessary external stimulus to cause all of the appropriate units to register at that time.

Further, if it were desirable to have many more units sharing each primary MIN, then they may be assigned a day of the month and an hour of the day to transmit their data. In this case, a single daily page containing the day of the month and 24 hourly pages containing the hour of the day could cause the appropriate devices to respond at the proper time accordingly.

As a specific example, consider a MIN range of 0023002000 to 0023002023 as "hour of the day" page values, and a range of 0023002101 to 0023002128 as "day of the month" page values. In both cases, the last two characters in the MIN represent a specific time to be matched by the remote devices.

Assume that at 30 minutes past midnight on the first day of the month, the MIN 0023002101 is broadcast, indicating to all the remote devices that it is now the first day of the month. All of the devices that are programmed with the 01 value as their SubMINs would recognize this page and become active. Others would simply ignore the mismatched page. If the utilization is simply "day of the month", then those devices could simply transmit their data at that time or at some delayed time thereafter.

If the application calls for "day of the month" and "hour of the day" time multiplexing, then those devices that are activated by the "day of the month" page above begin listening for a match to their "hour of the day" SubMIN identity. At 3:00 AM, a page with the value 0023002003 would be broadcast, and all of the remote devices with both an "01 day of the month" match and an "03 hour of the day" match would subsequently transmit their respective data. The other devices that do not find a match to the hour of the day simply ignore the "03" page and continue listening for their respective hour of the day match. Receipt of another "day of the month" page, different from the devices' own would cause it to stop listening for a match to the "hour of the day" pages.

It is also possible for the remote devices to contain their own clock circuits, allowing them to transmit their data automatically at the proper time of day and day of month. Real time clocks have a certain level of error, and eventually the indicated time drifts from the correct value. By using the paging methods described above, all of the remote devices' clocks may be synchronized on a regular basis. This regular basis may be as seldom as yearly or monthly, or as often as the application may require.

The above description thus provides for a method that can enable remote devices that do not include real time clocks to be used with the time-division embodiment. Also a method has been described for synchronizing devices that do use real time clock circuits, allowing those devices to achieve better time accuracy.

Referring now to FIG. 3, it illustrates a flow diagram of a third embodiment of a method 10 in accordance with the principles of the present invention for communicating between a central location and wireless remote data transport devices, such as remote monitoring or remote control devices. A plurality of remote monitoring or remote control devices, such as meters, for example, are employed that are located in a geographically proximate area. Each remote monitoring or remote control device is assigned 11 an identical primary MIN and assigned 13 a unique secondary SubMIN representing either a distinct unit or distinct active time slot as described above.

To communicate using this embodiment of the method 10, a first page (outbound transmission through the cellular system) containing the primary mobile identification number of the plurality of remote monitoring or remote control devices is transmitted 31 from the central location. All remote monitoring or remote control devices will receive the first page and become active. The remote monitoring or remote control devices may be activated for a predetermined time period, such as 1 minute for example.

Then, a second page-containing the secondary sub-mobile identification number (SubMIN) of a specific remote monitoring or remote control device that is to be communicated with is transmitted 32 from the central location. This is typically done during the predetermined time period.

Then, a third page containing a command that is to be implemented by the remote monitoring or remote control device containing the secondary identification number (SubMIN) transmitted in the second page is transmitted 33 from the central location. Again, this is done during the predetermined time period. The remote monitoring or remote control device having the secondary identification number SubMIN) transmitted in the second page then responds 34 to the command transmitted in the third page.

The remote monitoring or remote control device having the secondary identification number may be commanded to transmit its data, or transmit other relevant stored data that is programmed into it or is otherwise obtained or to execute a preprogrammed function such as turning another device on and off. Depending on the complexity of the identities of the remote units and the commands required, more or fewer consecutive pages may be required to execute the remote command function. It may be possible in simple systems to combine the SubMIN and a functional command into the second page, without the necessity for a third or more pages.

Thus, methods that extend the capabilities of wireless data transport services, such as cellemetry services, remote monitoring or remote control services, such as remote meter reading, and the like, have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A method of communicating with wireless remote data transport devices, comprising the steps of:

assigning an identical primary identification number to a plurality of wireless remote data transport devices;

storing the primary identification number of each wireless remote data transport device in a first data field that is transmitted by the respective wireless remote data transport device when communicating;

assigning a unique serial number to each wireless remote data transport device;

storing the unique serial number of each wireless remote data transport device in a second data field along with remote data that is transmitted by each wireless remote data transport device when communicating;

transmitting the first and second data fields during communication; and identifying each respective transmitting wireless data transport device by concatenating the secondary identification number stored in the second data field with the primary identification number stored in the first data field.

2. The method recited in claim 1 wherein the transmitting step comprises the step of transmitting the first data field containing the primary identification number and the second data field containing remote data.

3. The method recited in claim 1 wherein the transmitting step comprises the step of transmitting the first data field containing the primary identification number and transmitting the second data field containing an identification of the preprogrammed time slot during communication at the assigned transmission time.

4. A method of communicating with wireless remote data transport devices, comprising the steps of:

assigning an identical primary identification number to a plurality of wireless remote data transport devices;

storing the primary identification number of each wireless remote data transport device in a first data field that is transmitted by the respective wireless remote data transport device when communicating;

assigning a predetermined transmission time to each wireless remote data transport device at which the respective device is to transmit data;

activating each wireless remote data transport device at its assigned transmission time;

transmitting the first data field containing the primary identification number and a second data field containing remote data; and identifying each transmitting wireless data transport device using the primary identification number and the predetermined transmission time of the respective wireless data transport device.

5. The method recited in claim 4 wherein the second data field also contains an identification of the preprogrammed time slot during communication at the assigned transmission time.

6. The method recited in claim 4 further comprising the steps of:

assigning a unique serial number to each wireless remote data transport device;

storing the unique serial number of each wireless remote data transport device in a second data field that is transmitted by each wireless remote data transport device when communicating; and transmitting the second data field containing the unique serial number and the remote data during communication.

7. The method recited in claim 4 wherein the step of activating each wireless remote data transport device at its assigned transmission time comprises the step of paging a time to each of the wireless remote data transport devices at the time at which it should transmit its data.

8. The method recited in claim 4 wherein each of the wireless remote data transport devices contain a clock circuit, and wherein the method further comprises the step of transmitting a page that synchronizes the clock circuits of each of wireless remote data transport devices.

9. A method of communicating with wireless remote data transport devices, comprising the steps of:

assigning an identical primary identification number to a plurality of wireless remote data transport devices;

assigning a unique secondary identification number or time slot to each wireless remote data transport device;

transmitting a first page containing the primary identification number from the central location to the plurality of wireless remote data transport devices;

transmitting a second page from the central location that contains the secondary identification number or time slot of a wireless remote data transport device that is to be communicated with; and transmitting a second or additional page from the central location that contains a command that is to be implemented by the wireless remote data transport, device containing the secondary identification number, to evoke a response from the wireless remote data transport device having the secondary identification number.

10. The method recited in claim 9 wherein the first page activates each wireless remote data transport device for a predetermined time period, and the second and additional pages are transmitted during the predetermined time period.

* * * * *